United States Patent
Heo et al.

(10) Patent No.: US 9,924,521 B2
(45) Date of Patent: Mar. 20, 2018

(54) SIGNALING MESSAGE SYNCHRONIZATION

(71) Applicant: INTEL IP CORPORATION, Santa Clara, CA (US)

(72) Inventors: Youn Hyoung Heo, Seoul (KR); Yujian Zhang, Beijing (CN); Candy Yiu, Beaverton, OR (US); Hong He, Beijing (CN); Ana Lucia Pinheiro, Breinigsville, PA (US)

(73) Assignee: Intel IP Corporation, Santa Clara, CA (US)

( * ) Notice: Subject to any disclaimer, the term of this patent is extended or adjusted under 35 U.S.C. 154(b) by 273 days.

(21) Appl. No.: 14/316,412

(22) Filed: Jun. 26, 2014

(65) Prior Publication Data

US 2015/0029955 A1    Jan. 29, 2015

Related U.S. Application Data

(60) Provisional application No. 61/859,121, filed on Jul. 26, 2013.

(51) Int. Cl.
*H04W 76/04* (2009.01)
*H04W 74/08* (2009.01)
(Continued)

(52) U.S. Cl.
CPC .......... *H04W 72/082* (2013.01); *H01Q 1/243* (2013.01); *H01Q 3/00* (2013.01);
(Continued)

(58) Field of Classification Search
CPC ... H04W 4/005; H04W 16/28; H04W 76/046; H04W 36/0066; H04W 36/0083;
(Continued)

(56) References Cited

U.S. PATENT DOCUMENTS

2011/0310800 A1* 12/2011 Lin .................. H04W 28/14
                                                                 370/328
2012/0106460 A1*  5/2012 Yang ................ H04L 5/001
                                                                 370/328
(Continued)

FOREIGN PATENT DOCUMENTS

WO    WO 2011/079210 A1    6/2011
WO    WO 2012/137074 A1   10/2012
WO    WO 2013/104416 A1    7/2013

OTHER PUBLICATIONS

Jeanette Wannstrom, "Carrier Aggregation explained," Jun. 2013, 3rd Generation Partnership Project (3GPP) http://www.3gpp.org/technologies/keywords-acronyms/101-carrier-aggregation-explained.*

(Continued)

*Primary Examiner* — Maharishi Khirodhar
*Assistant Examiner* — Kenneth P Hunt
(74) *Attorney, Agent, or Firm* — Thorpe North & Western (57) ABSTRACT

Technology for supporting dual connectivity is disclosed. A user equipment (UE) may receive a radio resource control (RRC) reconfiguration message from a macro evolved node B (MeNB). The RRC reconfiguration message may indicate that a secondary cell associated with a secondary eNB (SeNB) is to be added for connection to the UE. The UE may complete an RRC reconfiguration procedure to add the secondary cell. The UE may send a preamble to the SeNB indicating that the UE has completed the RRC reconfiguration procedure. The UE may communicate data with the SeNB after sending the preamble to the SeNB, wherein the UE supports dual connectivity to the MeNB and the SeNB.

22 Claims, 8 Drawing Sheets

(51) Int. Cl.

| | |
|---|---|
| *H04W 72/08* | (2009.01) |
| *H04W 76/02* | (2009.01) |
| *H04W 52/02* | (2009.01) |
| *H04W 4/00* | (2018.01) |
| *H04L 5/14* | (2006.01) |
| *H04W 36/00* | (2009.01) |
| *H04W 24/08* | (2009.01) |
| *H04W 72/04* | (2009.01) |
| *H04L 29/06* | (2006.01) |
| *H04W 24/02* | (2009.01) |
| *H04W 16/28* | (2009.01) |
| *H04J 11/00* | (2006.01) |
| *H04W 24/10* | (2009.01) |
| *H04W 36/30* | (2009.01) |
| *H01Q 1/24* | (2006.01) |
| *H01Q 3/00* | (2006.01) |
| *H04W 28/12* | (2009.01) |
| *H04B 7/06* | (2006.01) |
| *H04W 84/12* | (2009.01) |
| *H04W 88/06* | (2009.01) |
| *H04W 88/08* | (2009.01) |
| *H04L 5/00* | (2006.01) |
| *H04W 84/18* | (2009.01) |

(52) U.S. Cl.
CPC ......... *H04B 7/0632* (2013.01); *H04B 7/0695* (2013.01); *H04J 11/0023* (2013.01); *H04L 5/14* (2013.01); *H04L 69/16* (2013.01); *H04W 4/005* (2013.01); *H04W 16/28* (2013.01); *H04W 24/02* (2013.01); *H04W 24/08* (2013.01); *H04W 24/10* (2013.01); *H04W 28/12* (2013.01); *H04W 36/0066* (2013.01); *H04W 36/0083* (2013.01); *H04W 36/30* (2013.01); *H04W 52/0209* (2013.01); *H04W 72/042* (2013.01); *H04W 72/0413* (2013.01); *H04W 74/0833* (2013.01); *H04W 76/02* (2013.01); *H04W 76/021* (2013.01); *H04W 76/023* (2013.01); *H04W 76/046* (2013.01); *H04L 5/0007* (2013.01); *H04W 84/12* (2013.01); *H04W 84/18* (2013.01); *H04W 88/06* (2013.01); *H04W 88/08* (2013.01); *Y02B 60/50* (2013.01)

(58) Field of Classification Search
CPC ............... H04W 24/08; H04W 72/082; H04W 72/0413; H04W 76/021; H04W 74/0833; H04W 76/023; H04W 24/02; H04W 52/0209; H04W 84/12; H04W 88/06; H04W 88/08; H04W 76/02; H04W 76/025; H04W 16/32; H04J 11/0023; H04L 5/14; H04L 69/16; H04L 5/0007; Y02B 60/50
USPC ........................................................ 370/329
See application file for complete search history.

(56) References Cited

U.S. PATENT DOCUMENTS

| | | | |
|---|---|---|---|
| 2012/0106510 A1 | 5/2012 | Kuo | |
| 2012/0275390 A1* | 11/2012 | Korhonen | H04W 74/006 370/329 |
| 2012/0294213 A1* | 11/2012 | Chen | H04L 5/001 370/311 |
| 2012/0300714 A1 | 11/2012 | Ng et al. | |
| 2013/0250881 A1* | 9/2013 | Liao | H04W 36/08 370/329 |
| 2014/0079011 A1* | 3/2014 | Wiberg | H04W 74/006 370/329 |
| 2014/0307586 A1* | 10/2014 | Zhang | H04L 5/0098 370/254 |
| 2015/0003418 A1* | 1/2015 | Rosa | H04W 36/0005 370/331 |
| 2015/0110018 A1* | 4/2015 | Rosa | H04W 72/0426 370/329 |
| 2015/0223212 A1* | 8/2015 | Der Velde | H04L 5/0032 370/329 |
| 2015/0223270 A1* | 8/2015 | Kim | H04W 74/0833 370/329 |
| 2015/0282239 A1* | 10/2015 | Han | H04W 76/025 370/329 |
| 2015/0319778 A1* | 11/2015 | Folke | H04W 48/20 370/330 |
| 2015/0334747 A1* | 11/2015 | Wang | H04W 48/14 370/336 |
| 2015/0341148 A1* | 11/2015 | Kazmi | H04L 5/0098 370/252 |
| 2016/0057660 A1* | 2/2016 | Hong | H04W 36/0016 455/436 |
| 2016/0066241 A1* | 3/2016 | Wu | H04W 36/28 370/331 |
| 2016/0073273 A1* | 3/2016 | Li | H04W 24/10 455/449 |
| 2016/0242092 A1* | 8/2016 | Rosa | H04W 36/0016 |

OTHER PUBLICATIONS

Interdigital Communications; Dual Connectivity for Small Cell Deployments; Document for Discussion, Decision; http://www.3gpp.org/ftp/tsg_ran/WG2_RL2/TSGR2_81bis/Docs/R2-31328.zip; Apr. 2013; 4 pages; InterDigital Communications.
3GPP Organizational Partners; 3$^{rd}$ Generation Partnership Project; Technical Specification Group Radio Access Network; Evolved Universal Terrestrial Radio Access (E-UTRA); Study on Small Cell Enhancements for E-UTRA and E-UTRAN—Higher layer aspects; 3GPP TR 36.842 V0.2.0 Technical Report; May 2013; 38 Pages; Release 12; 3GPP Organizational Partners.
PCT Application PCT/US2014/047425; filing Jul. 21, 2014; Intel IP Corporation et al.; International Search Report dated Nov. 27, 2014.
LG Electronics Inc., "RACH applicability and TA group", R2-116228, 3GPP TSG-RAN2 Meeting #76, Nov. 14-18, 2011, Agenda 7.1.2.4, San Francisco, USA.
CATT, "Analysis on RRC Message Ambiguity for C-plane Architectures", R2-131917, 3GPP TSG RAN WG2 Meeting #82, May 20-24, 2013, Agenda 7.2.2.2, Fukuoka, Japan.

\* cited by examiner

SIGNALING MESSAGE SYNCHRONIZATION

RELATED APPLICATIONS

The present application claims priority to U.S. Provisional Patent Application No. 61/859,121, filed Jul. 26, 2013, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Heterogeneous networks have been widely regarded as a key technology for combating spectrum crunch and meeting wireless communication traffic growth in the years to come. Spectrum crunch can refer to user demand for data exceeding the spectrum bands and bandwidth available on current network infrastructures.

Figure 1:
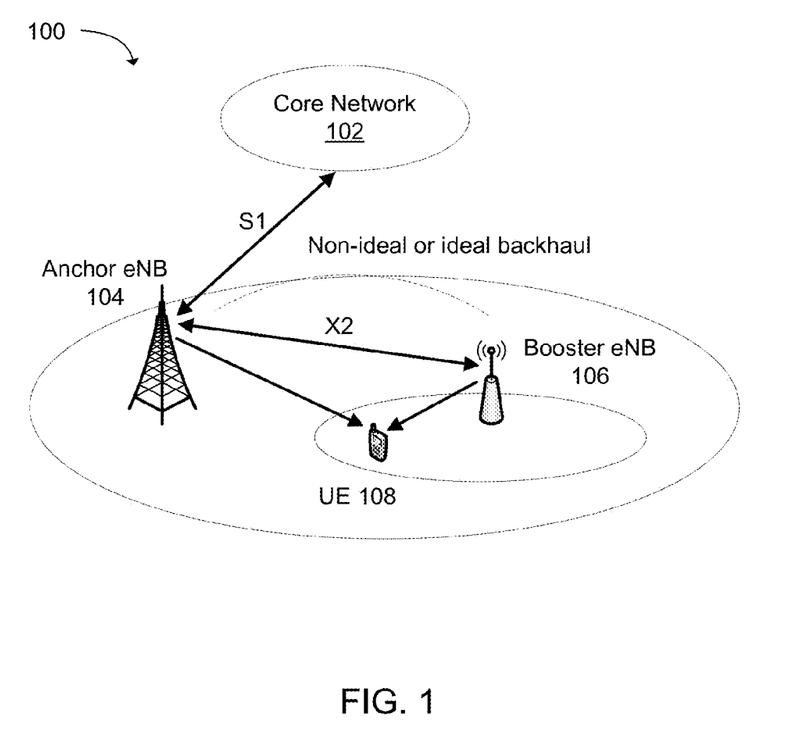
FIG. 1 illustrates an anchor-booster network architecture in accordance with an example.

FIG. 1 illustrates an exemplary anchor-booster network architecture 100. The anchor-booster network architecture 100 is a form of heterogeneous network. The anchor-booster network architecture 100 can include at least one anchor evolved node B (eNB) 104 and at least one booster eNB 106. The anchor eNB 104 can be associated with an anchor cell, macro cell or primary cell. The booster eNB 106 can be associated with a booster cell, small cell or secondary cell. The booster eNB 106 can operate in the same or different frequency bands as the anchor eNB 104.

The anchor eNB 104 can be a high transmission power eNB for coverage and connectivity. The anchor eNB 104 is responsible of mobility because the coverage of the anchor eNB 104 is generally wider than that of the booster eNB 106. The anchor eNB 104 can also be responsible for radio resource control (RRC) signaling. The booster eNB 106 can be a low transmission power eNB for traffic offloading (i.e., offloading data transmissions) and quality of service (QoS) enhancement. The anchor eNB 104 and the booster eNB 106 can both serve packet data depending on the required QoS. For example, the anchor eNB 104 can serve delay sensitive data, such as Voice over IP (VoIP), while the booster eNB 106 services delay tolerant data, such as file transfer protocol (FTP).

A user equipment (UE) 108 can be supported by both the booster eNB 106 and the anchor eNB 104 in order to ensure mobility robustness, satisfy QoS performance and balance the traffic load between the anchor eNB 104 and the booster eNB 106. In other words, the UE 108 can support dual connectivity because the UE is served by both the booster eNB 106 and the anchor eNB 104. With such dual connectivity, the anchor eNB 104 can handle control plane signaling and delay-sensitive traffic, while the booster eNB 106 can handle delay-tolerant user-plane traffic.

As shown in FIG. 1, the booster eNB 106 can be deployed under the coverage of the anchor eNB 104 and connected to the core network 102 via the anchor eNB 104. The anchor eNB 104 and the booster eNB 106 can be connected via an X2 interface. The anchor eNB 104 and the core network 102 can be connected via an S1 interface. The backhaul link connecting the anchor eNB 104 and the booster eNB 106 can be ideal or non-ideal, wherein an "ideal" backhaul link has a latency (in milliseconds) that is less than a predetermined value and a "non-ideal" backhaul link has a latency that is greater than the predetermined value.

Each backhaul technology can be associated with a latency (one-way), throughput and priority level. For example, fiber access 1 can have a latency of 10-30 ms, fiber access 2 can have a latency of 5-10 ms, fiber access 3 can have a latency of 2-5 ms, digital subscriber line (DSL) access can have a latency of 10-60 ms, and wireless backhaul can have a latency of 5-35 ms. In one configuration, the latencies associated with fiber access 1, fiber access 2, fiber access 3, DSL access and wireless backhaul may be greater than the predetermined value, and therefore, are considered to be non-ideal backhauls. As another example, fiber can have a latency (one-way) that does not exceed 2.5 microseconds (μs). In one configuration, the latency associated with fiber may be less than the predetermined value, and therefore, is considered to be an ideal backhaul.

The macro/anchor cell can function as an "umbrella" cell and the small/booster cells can be added to the UE as secondary cells. As described in further detail below, the small/booster cell can be added or removed to the UE via signaling between the UE, SeNB and MeNB. Upon addition of the small/booster cell being coordinated between the MeNB and the SeNB, a radio resource control (RRC) message (i.e., a control plane message) can be communicated to the UE to add the small/booster cell. The RRC message can be communicated to the UE from either the MeNB or the SeNB.

Figure 2:
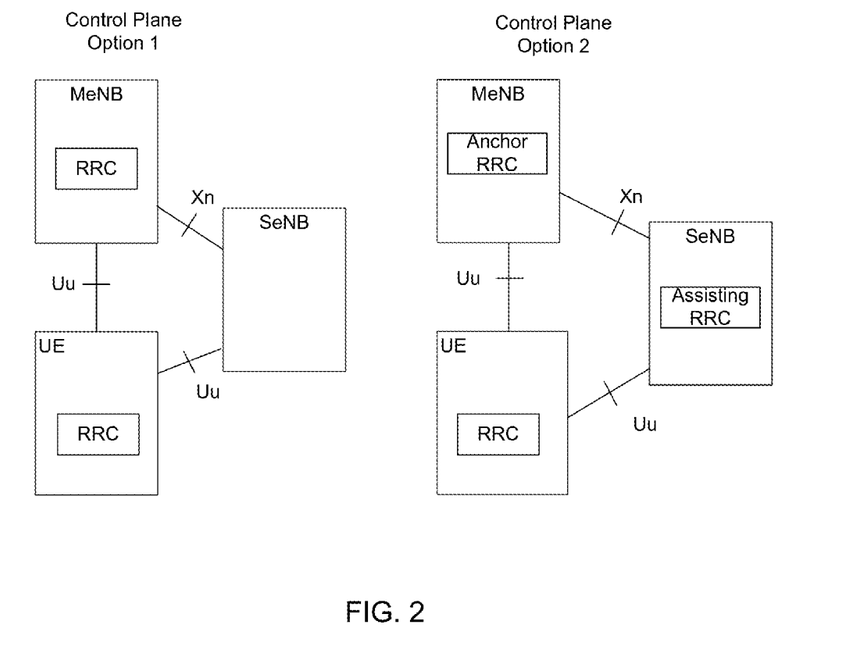
FIG. 2 illustrates control plane architecture supporting dual connectivity in accordance with an example.

FIG. 2 illustrates an example of control plane architecture that can support dual connectivity. Dual connectivity generally supports two options for the control plane architecture. The two options differ with respect to which entity, either the SeNB or the MeNB, generates abstract syntax notation one (ASN.1) encoded RRC messages to be received at the UE upon addition or removal of the SeNB.

In option 1, the MeNB can generate RRC messages to be sent to the UE after coordination of radio resource management (RRM) functions between the MeNB and SeNB. The UE RRC entity can receive RRC messages coming from an RRC entity in the MeNB, and the UE can respond to the MeNB RRC entity. In order to configure a radio resource of the SeNB, the SeNB can provide radio resource related information to the MeNB. The MeNB can generate an RRC message including the SeNB's radio resource information and send the RRC message to the UE. In other words, the UE and the SeNB communicate with one another indirectly via the MeNB. Option 1 can support dual connectivity with minimal modification to existing control plane architecture and the UE's RRC operation. However, the SeNB may not exactly know when the UE receives the RRC message from the MeNB and completes the RRC procedure. In other words, the MeNB may not inform the SeNB when the UE completes the RRC procedure (e.g., adding the SeNB).

In option 2, either the MeNB or the SeNB can generate RRC messages to be sent directly to the UE, depending on L2 architecture, after coordination of RRM functions between the MeNB and SeNB. The UE RRC entity can receive RRC messages from the MeNB and reply directly to the MeNB. Alternatively, the UE RRC entity can receive RRC messages from the SeNB and reply directly to the SeNB. Therefore, the MeNB and SeNB can both include RRC functionality. For example, the MeNB can include an anchor RRC entity that communicates with the UE RRC entity and the SeNB can include an assisting RRC entity that communicates with the UE RRC entity.

In option 2, the MeNB and SeNB can send RRC messages independently to the UE. A problem may arise when the SeNB sends an RRC configuration reconfiguration message including secondary cell (SCell) removal (i.e., an indication to remove the secondary cell). When the UE receives the RRC connection reconfiguration message for the corresponding secondary cell, the UE may send an RRC connection reconfiguration complete message to the SeNB to indicate that the UE has successfully received the SCell removal indication and has applied the RRC connection reconfiguration (e.g., remove the secondary cell). However, the UE cannot send the RRC connection reconfiguration message indicating the secondary cell removal because the UE cannot transmit uplink signaling once the secondary cell is removed. In other words, the UE cannot send messages to secondary cells that have since been removed. As described in further detail below, the UE, SeNB and MeNB can communicate signaling among each other for addition, modification, removal, activation and deactivation of secondary cells that support options 1 and/or 2 as described above.

Secondary Cell Addition

In the configuration, the UE can receive an RRC reconfiguration message with SCell addition from the MeNB. SCell addition can refer to addition of a secondary cell that can communicate with the UE. The UE can complete an RRC procedure and the SCell can be added. However, The SeNB may be unaware of when the UE completes the RRC procedure and is ready to transmit and receive information with the SeNB. In other words, the SeNB may not know when it's been added and is capable of communicating with the UE. In one example, the UE can indicate that the RRC procedure has been completed by sending a preamble to the SeNB.

In 3GPP Release 11, multiple timing advanced group (TAG) is introduced to allow different uplink timing advances (TAs) in multiple cells in carrier aggregation (CA). A primary cell can have different uplink timing than a secondary cell if the primary cell and the secondary cell belong to different TAGs. When the secondary cell is added and uses a different TA, the eNB can configure a secondary TAG(s). In addition, the eNB can trigger random access by using physical downlink control channel (PDCCH) order (i.e., contention free random access). A similar operation can be applied for secondary cells in dual connectivity. Since random access on the secondary cell is only supported with PDCCH order transmitted on the secondary cell, the SeNB cannot send PDCCH in order to trigger random access because the UE cannot monitor PDCCH before it is activated. The secondary cell cannot be activated before the SeNB knows that the UE has completed the RRC configuration including the SCell addition.

Figure 3:
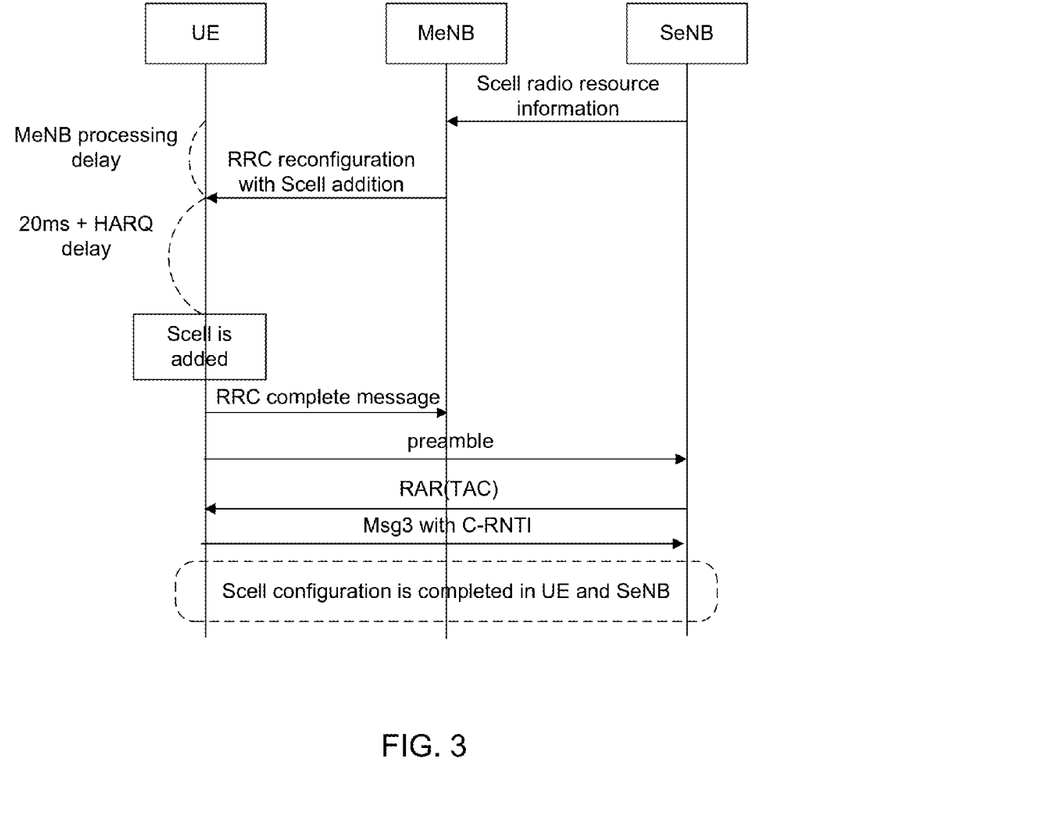
FIG. 3 illustrates signaling for adding a secondary cell for communication with a user equipment (UE) in accordance with an example.

FIG. 3 illustrates exemplary signaling for adding a secondary cell for communication with a user equipment (UE) using contention based random access. The secondary cell can be within an anchor cell that is supporting the UE. SCell addition can be used to add a small cell as the secondary cell. A primary cell and the secondary cell can be connected through an ideal backhaul or a non-ideal backhaul. In one example, whether the secondary cell is connected through a non-ideal backhaul can be indicated. In this case, the UE can use contention based random access and send a preamble to the SeNB.

As shown in FIG. 3, the SeNB can send SCell radio resource information to the MeNB after the MeNB requests the SeNB to be added. The SCell radio resource information can indicate to the UE that the SeNB is to be added in order to communicate with the UE. A predefined processing delay may occur at the eNB. The MeNB can send an RRC reconfiguration message to the UE that includes SCell addition. After an approximately 20 millisecond (ms) and hybrid automatic repeat request (HARQ) delay, the secondary cell can be added. In other words, the UE can receive the RRC reconfiguration message from the MeNB and apply the reconfiguration procedure to add the secondary cell. The UE can be configured to communicate with the SeNB after the secondary cell is added. However, the SeNB may be unaware that the SCell has been added. Therefore, the UE can send an RRC complete message to the MeNB. In addition, the UE can send a preamble to the SeNB. In one example, the UE may send the RRC complete message and the preamble substantially in parallel.

In response to receiving the preamble, the SeNB can send a random access response (RAR) message to the UE. The RAR message is generally sent by the SeNB in response to a random access preamble. The RAR message can be sent on the PDSCH and addressed with a random access radio network temporary identifier (RA-RNTI), which identifies a time-frequency slot in which the preamble was detected. The RAR message can include an identity of the detected preamble and an assignment of a cell-RNTI (C-RNTI). In addition, the RAR message may include a tracking area code (TAC), which is a 16-bit integer that is included in a tracking area identity. The UE may send a Msg3 with the C-RNTI to the SeNB. After the UE receives the RAR message and sends the Msg3 with C-RNTI to the SeNB, the SeNB can determine that the UE has added the SCell. In other words, after the UE receives the RAR message and sends the Msg3 with C-RNTI to the SeNB, the SCell configuration can be completed in the UE and the SeNB. The UE and the SeNB can thereafter communicate data with each other.

Figure 4:
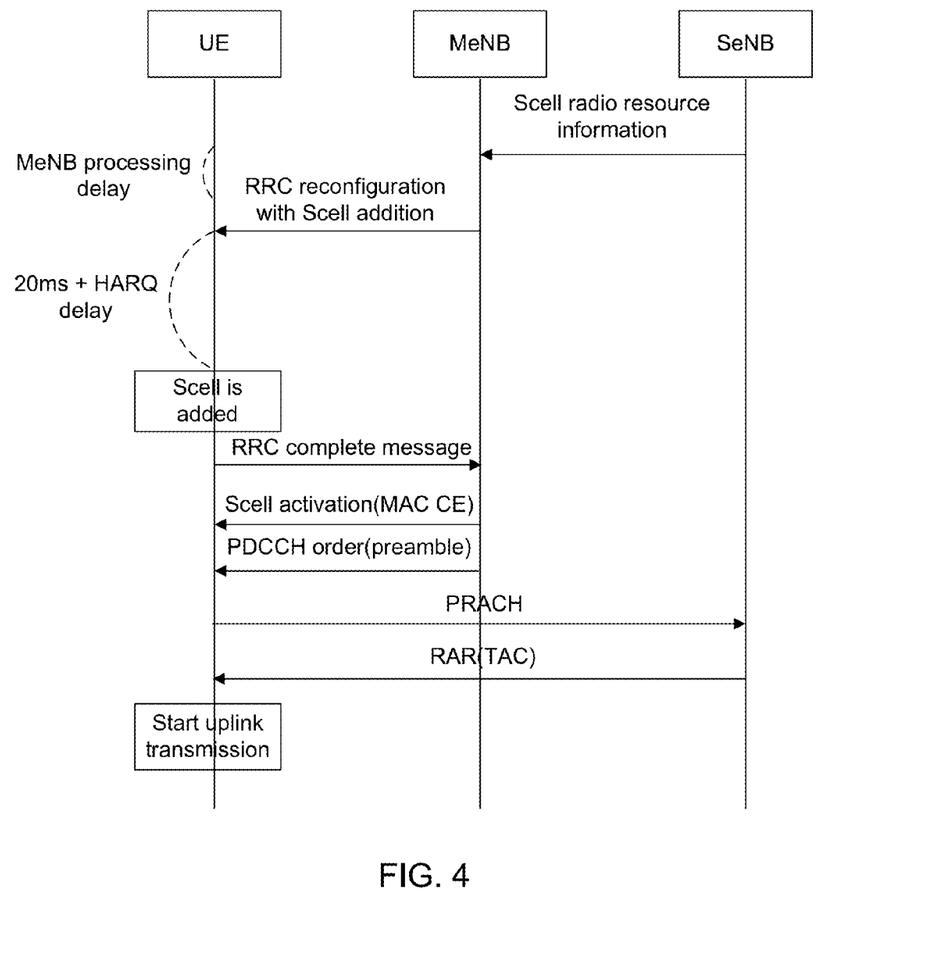
FIG. 4 illustrates additional signaling for adding a secondary cell for communication with a user equipment (UE) in accordance with an example.

FIG. 4 illustrates yet another example of signaling for adding a secondary cell for communication with a user equipment (UE) using contention free random access. The SeNB can send SCell radio resource information to the MeNB. The SCell radio resource information can indicate that the SeNB is to be added in order to communicate with the UE. A predefined processing delay may occur at the eNB. The MeNB can send an RRC reconfiguration message to the UE that includes SCell addition. After an approximately 20 millisecond (ms) and hybrid automatic repeat request (HARQ) delay, the secondary cell can be added. In other words, the UE can receive the RRC reconfiguration message from the MeNB and apply the reconfiguration procedure to add the secondary cell. The UE can be configured to communicate with the SeNB after the secondary cell is added. However, the SeNB may be unaware that the SCell has been added.

The UE can send an RRC complete message to the MeNB. In response to sending the RRC complete message, the UE can receive a secondary cell activation media access channel control element (MAC CE) from the MeNB. In addition, the MeNB can send a dedicated preamble to the UE via physical downlink control channel (PDCCH) order or RRC signaling. In other words, the MeNB can include resource information of the dedicated preamble for the SCell in an RRC signaling message sent to the UE when the SCell is added. In an alternative configuration, the MeNB can include the dedicated preamble information in the RRC reconfiguration message with the SCell addition. The SeNB can indicate the dedicated preamble information with other SCell radio resource information sent from the SeNB to the MeNB.

The UE can send a preamble to the SeNB using a physical random access channel (PRACH). The SeNB can detect that the UE added the SCell upon receiving the preamble in the PRACH from the UE. In response to receiving the preamble, the SeNB can send a random access response (RAR) message to the UE. The RAR message may include a tracking area code (TAC), which is a 16-bit integer that is included in a tracking area identity. The UE can perform an uplink transmission to at least one of the MeNB or the SeNB upon receiving the RAR message from the SeNB.

In contention based random access (as described with respect to FIG. 3), as well as in contention-free random access (as described with respect to FIG. 4), the UE can send the preamble to the SeNB before the SCell is activated by the MAC CE. The UE can send the preamble before SCell activation if the SCell activation is managed by the SeNB (i.e., the SCell activation is not managed by the MeNB) and the SeNB sends the MAC CE for the SCell's activation. If the UE sends the preamble before the SCell is activated by the MAC CE, the UE can assume that the SCell is implicitly activated with the SCell addition message. Therefore, the UE can continue to monitor the SCell. Alternatively, the UE can assume that the SCell is deactivated and the UE may deactivate the SCell after a random access procedure is successfully completed.

If the MeNB activates the SCell using the MAC CE, the UE can send the preamble to the SeNB when the corresponding SCell is activated. If the period of time between the RRC reconfiguration for the SCell addition and an SCell activated timing is above a defined period, the SeNB can already determine that the UE has completed the RRC reconfiguration via an indication from the MeNB. Therefore, a timer can start when the RRC reconfiguration for the SCell addition is configured by the MeNB. If the timer is expired before the SeNB is activated, the UE may not need to send the preamble to the SeNB because the SeNB may have already determined that the SCell has been added via signaling from the MeNB.

Secondary Cell Modification

In one example, the SeNB can request the MeNB to modify SCell radio resource information. The MeNB can send a radio resource control (RRC) reconfiguration message including SCell modification to the UE. The UE can complete the RRC procedure and the SCell radio resource information of the SeNB can be modified. However, the SeNB may not know when the UE completes the RRC procedure and is ready to transmit and receive information with the SeNB using the modified radio resource information. Therefore, the UE can indicate that the RRC procedure has been completed to the SeNB.

When performing the SCell modification, timing synchronization may not be established because the timing synchronization can already be maintained, unlike when the SCell is added. In order to indicate that the UE has completed the RRC reconfiguration for SCell modification, random access can be performed. However, random access may involve performing downlink signaling for a RAR (random access response), which is unnecessary for synchronized serving cells and is an inefficient consumption of bandwidth.

In one example, the RAR can be avoided when indicating that the UE has completed the RRC reconfiguration for SCell modification, thereby resulting in a more efficient use of signaling. The UE can send a dedicated preamble to the SeNB. The SeNB may not send the RAR to the UE in response to receiving the dedicated preamble from the UE. Thus, the UE can assume that the dedicated preamble is successfully transmitted to the SeNB if the UE receives downlink or uplink scheduling with a C-RNTI during a random access response window.

In an alternative example, a scheduling request (SR) can be triggered. The UE can trigger the SR to the SCell when the UE completes the RRC configuration of the SCell. Therefore, the SeNB can be notified via the scheduling request that the UE has completed the RRC procedure and the SCell has been modified.

Secondary Cell Removal

When the SCell served by the SeNB is not useful to the UE (e.g., due to low channel quality or a loading issue), the SeNB can send an RRC connection reconfiguration message including SCell removal to the MeNB. In other words, the SeNB can send a request to remove itself to the MeNB. The MeNB can send a radio resource control (RRC) reconfiguration message including SCell removal to the UE. The UE can complete the RRC procedure and the SCell can be removed. The UE can attempt to send an RRC complete message to the SeNB indicating that the SCell has been removed. However, once the SCell is removed, the UE may be unable to send an uplink signal to the SeNB. In other words, the UE may be unable to send an RRC connection reconfiguration complete message to the SeNB notifying the SeNB that the SCell has been removed.

In one configuration, the UE may not send the RRC connection reconfiguration message to the SeNB if the RRC connection reconfiguration message is for removal of a corresponding SCell. Therefore, the SeNB may not become unaware that the SCell has been removed from the UE. However, the SeNB may be notified that the SCell has been removed from the MeNB after a defined time period.

In an alternative configuration, the UE can send the RRC connection reconfiguration complete message to the SeNB if the RRC connection reconfiguration message is for removal of a corresponding SCell. Thereafter, the UE can apply the SCell removal. In other words, the UE can notify the SeNB that the UE is going to remove the SCell (i.e., when a connection between the UE and the SeNB is still present) and then subsequently remove the SCell.

In yet another configuration, the UE can send the RRC connection reconfiguration complete message to the MeNB if the RRC connection reconfiguration message is for removal of a corresponding SCell. The MeNB can forward the RRC connection reconfiguration complete message to the SeNB in order to notify the SeNB that the SCell has been removed.

Secondary Cell Activation from the SeNB

In some examples, particular user plane architectures can allow the SeNB to determine whether to activate or deactivate an SCell more effectively than the MeNB. For example, the SeNB can activate the SCell during an occurrence of downlink or uplink traffic. However, the UE may not monitor a PDCCH of the SCell during SCell deactivation, so the UE may not receive a SCell activation MAC control element (MAC CE) from the corresponding SCell. In other words, the UE may not be notified of the SCell activation from the SCell.

In one example, the SeNB can instruct the MeNB to activate the SCell. The MeNB can send an SCell activation MAC CE to the UE indicating that the SCell has been activated. However, the SeNB may be unable to detect whether the UE successfully receives the SCell activation MAC CE from the MeNB. In other words, the SeNB may be unable to detect when the SCell is activated.

In one configuration, the UE can indicate the SCell activation to the SeNB via an uplink control channel. The UE can notify the SeNB of the SCell activation upon receiving the SCell activation MAC CE from the MeNB. The UE can be configured to send uplink control information, such as channel state information (CSI) or Sounding Reference Signal (SRS), to the SeNB. If the UE receives an indication of the SCell activation from MeNB, the UE can send a predefined CSI value or SRS to the SeNB. Once the SeNB detects the CSI or SRS, the SeNB can start scheduling in the SCell. However, if a periodicity associated with the CSI or SRS is above a defined value, a delay can occur in activating the SCell.

In an alternative configuration, the SCell activation can be performed according to a configured activation time. The SeNB can identify the activation time, and therefore, determine when the SCell has been activated based on the activation time. The activation time can be included in a MAC CE activating the SCell or RRC signaling. A processing time for SCell activation can be 24 ms or 34 ms, as defined in 3GPP TS 36.133. If the activation time is smaller than the processing time for SCell activation, the activation time may not be configured. The activation time can be determined based on a period of time for the SeNB to be notified, from the MeNB, of a successful transmission of the MAC CE indicating that the SCell has been activated from the MeNB to the UE. The period of time may be affected by X2 signaling latency and/or MeNB processing time.

In yet another configuration, the MeNB can indicate to the SeNB that the UE has successfully received the MAC CE. The MeNB can notify the SeNB upon determining that the UE has successfully received the MAC CE via hybrid automatic repeat request (HARQ)-acknowledgement (ACK) or related techniques. The MeNB can include timing information in the message sent to the SeNB. The timing information can include a system frame number and/or a subframe number for when the UE correctly received the MAC CE. Therefore, the SeNB can know an activation time (i.e., when the SCell was activated).

In an additional configuration, the UE can send a random access preamble to the SeNB using a physical random access channel (PRACH). The UE can send the random access preamble when the UE receives the MAC CE indicating the SCell activation from the MeNB. Therefore, the SeNB can know when the SCell is activated.

Scheduling Request During Secondary Cell Deactivation

In one example, the UE may wish to send a scheduling request (SR) on a PUCCH or via random access, which are only configured on a primary cell (PCell). Depending on the user plane architecture, the UE may wish to send the scheduling request to the SeNB in order to indicate that there is uplink data in a logical channel associated with the SeNB. However, if the SCell corresponding to SeNB is deactivated, the UE may be unable to send the scheduling request because the UE may not be allowed to transmit or receive information on the deactivated SCell.

In one configuration, the UE can send the scheduling request to the SeNB, even though the SeNB is deactivated. In other words, the UE may be allowed to transmit information on the deactivated SCell. The UE can send the scheduling request on the SCell when there is uplink data in the logical channel associated with the SeNB while the SCell is deactivated.

In an alternative configuration, the UE can send a buffer status report (BSR) of the SCell to the MeNB. The UE can send the BSR to the MeNB when there is uplink data in the logical channel associated with the SeNB while the SCell is deactivated. In other words, if the BSR is triggered when the SCell is deactivated, the UE can send the BSR to the MeNB. The BSR can be included in a media access control protocol data unit (MAC PDU) sent from the UE to the MeNB. In addition, the BSR can trigger a scheduling request in a PCell if there is an available PUSCH. The MeNB can receive the BSR of the SCell from the UE and forward the BSR to the SeNB. Therefore, since the SeNB is unable to receive the BSR directly from the UE because the SCell is deactivated, the SeNB can receive the BSR from the UE via the MeNB.

In yet another configuration, the UE can trigger contention based random access on the SCell when there is uplink data in the logical channel associated with the SeNB while the SCell is deactivated. Therefore, the SeNB can detect the presence of the uplink data in the logical channel, even though the SCell is deactivated.

Figure 5:
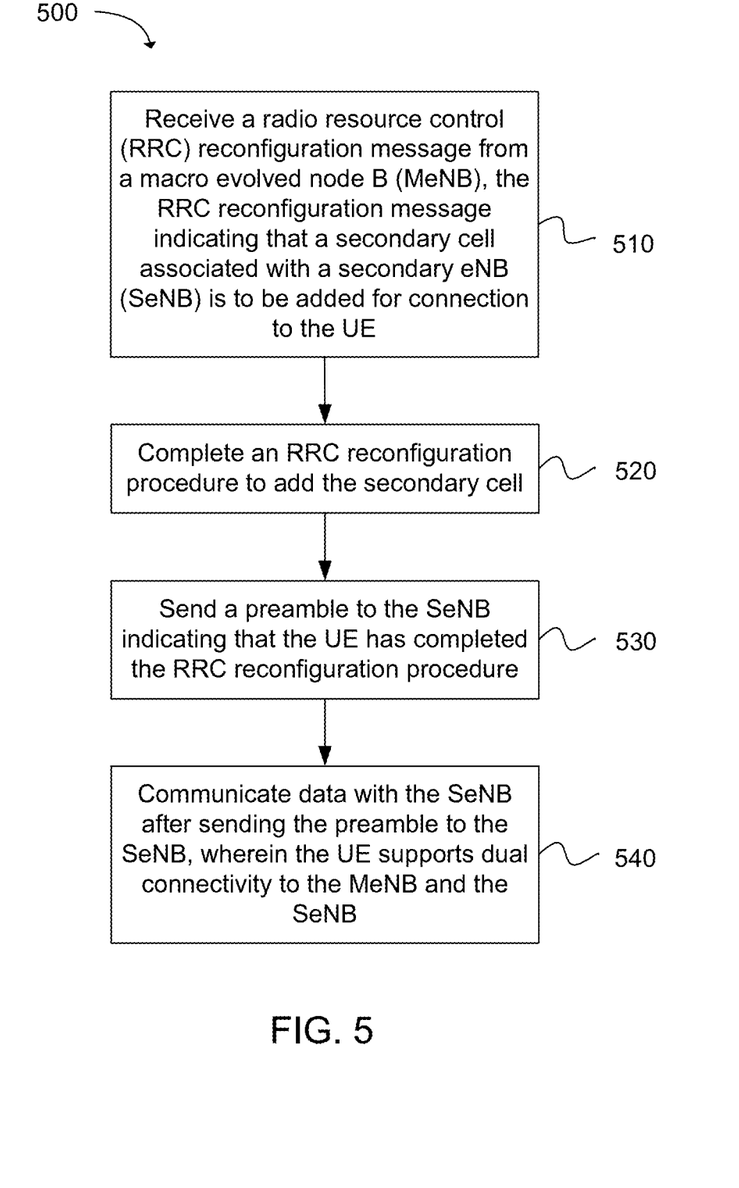
FIG. 5 depicts functionality of computer circuitry of a user equipment (UE) operable to support dual connectivity in accordance with an example.

Another example provides functionality 500 of computer circuitry of a user equipment (UE) operable to support dual connectivity, as shown in the flow chart in FIG. 5. The functionality may be implemented as a method or the functionality may be executed as instructions on a machine, where the instructions are included on at least one computer readable medium or one non-transitory machine readable storage medium. The computer circuitry can be configured to receive a radio resource control (RRC) reconfiguration message from a macro evolved node B (MeNB), the RRC reconfiguration message indicating that a secondary cell associated with a secondary eNB (SeNB) is to be added for connection to the UE, as in block 510. The computer circuitry can be configured to complete an RRC reconfiguration procedure to add the secondary cell, as in block 520. The computer circuitry can be further configured to send a preamble to the SeNB indicating that the UE has completed the RRC reconfiguration procedure, as in block 530. In addition, the computer circuitry can be configured to communicate data with the SeNB after sending the preamble to the SeNB, wherein the UE supports dual connectivity to the MeNB and the SeNB, as in block 540.

In one example, the computer circuitry can be further configured to determine whether a contention-free preamble is configured in the RRC reconfiguration procedure; and determine to not send the preamble to the SeNB when the contention-free preamble is not configured in the RRC reconfiguration procedure. In addition, the computer circuitry can be further configured to send the preamble to the SeNB using contention based random access.

In one example, the computer circuitry can be further configured to send an RRC complete message to the MeNB substantially in parallel with sending the preamble to the SeNB. In addition, the computer circuitry can be further configured to: receive a random access response (RAR) message from the SeNB; and send a Msg3 message including a cell radio network temporary identifier (C-RNTI) to the SeNB, wherein the SeNB determines that the UE has added the secondary cell upon receiving the Msg3 message with the C-RNTI. Furthermore, the computer circuitry can be configured to send the preamble to the SeNB using contention free random access.

In one example, the computer circuitry can be further configured to send the preamble to the SeNB in a physical random access channel (PRACH), wherein the preamble is a dedicated preamble resource configuration received, at the UE, from the MeNB in a physical downlink control channel (PDCCH) order message. In one configuration, the dedicated preamble resource configuration for the SeNB is received at the UE from the MeNB in the RRC reconfiguration message, wherein the MeNB can receive dedicated preamble information in a secondary cell radio resource information message from the SeNB via an X2 interface.

In one example, the computer circuitry can be further configured to receive a dedicated preamble from the MeNB; send the dedicated preamble to the SeNB using a physical random access channel (PRACH); receive a random access response (RAR) message from the SeNB; and perform an uplink transmission to at least one of the MeNB and the SeNB. In one configuration, the UE sends the preamble to the SeNB before the SeNB is activated by the MeNB using a media access control (MAC) control element (CE). In one example, the MeNB is associated with one of an anchor cell, macro cell or primary cell and the SeNB is associated with one of a booster cell, small cell or secondary cell. In yet another example, the MeNB supports delay-sensitive traffic and the SeNB supports delay-tolerant traffic.

Figure 6:
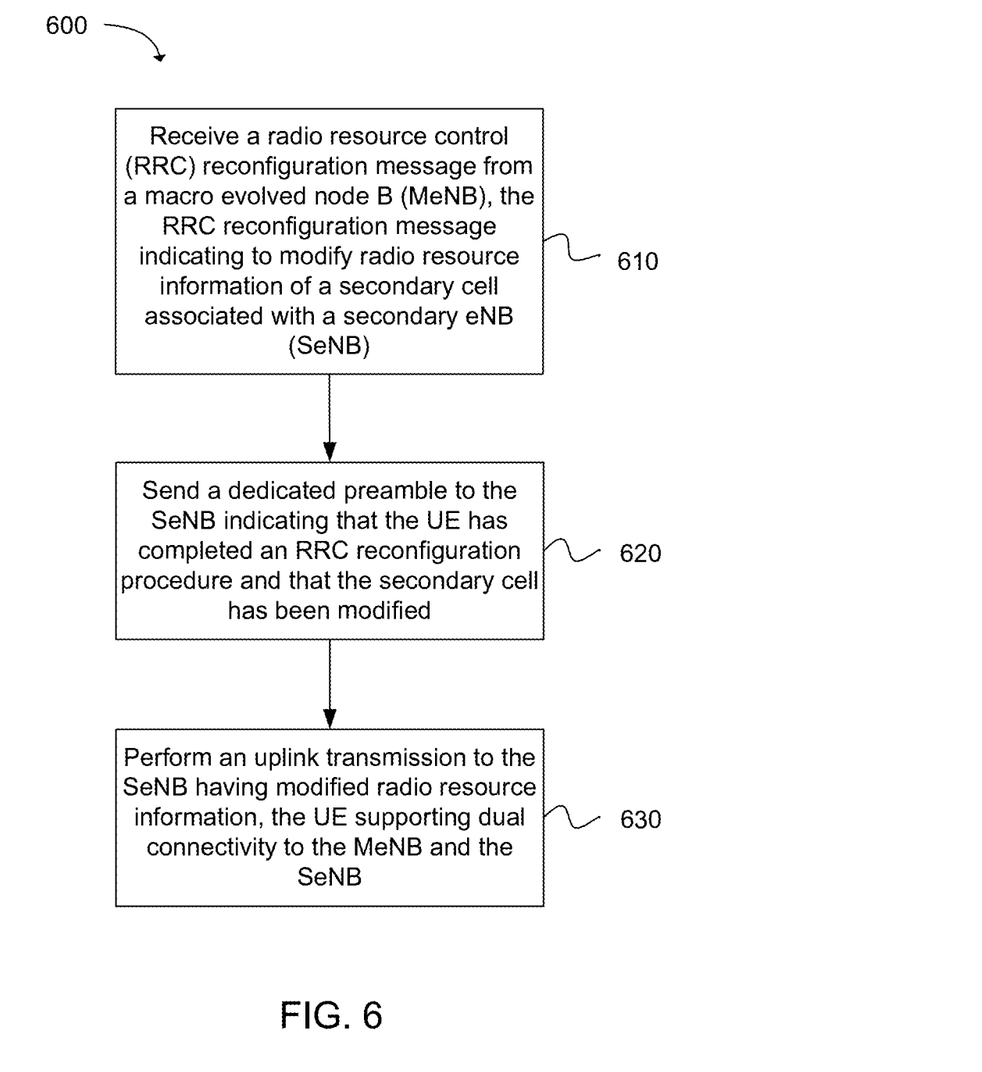
FIG. 6 depicts functionality of computer circuitry of a user equipment (UE) operable to support dual connectivity in accordance with an example.

Another example provides functionality 600 of computer circuitry of a user equipment (UE) operable to support dual connectivity, as shown in the flow chart in FIG. 6. The functionality may be implemented as a method or the functionality may be executed as instructions on a machine, where the instructions are included on at least one computer readable medium or one non-transitory machine readable storage medium. The computer circuitry can be configured to receive a radio resource control (RRC) reconfiguration message from a macro evolved node B (MeNB), the RRC reconfiguration message indicating to modify radio resource information of a secondary cell associated with a secondary eNB (SeNB), as in block 610. The computer circuitry can be configured to send a dedicated preamble to the SeNB indicating that the UE has completed an RRC reconfiguration procedure and that the secondary cell has been modified, as in block 620. The computer circuitry can be further configured to perform an uplink transmission to the SeNB having modified radio resource information, the UE supporting dual connectivity to the MeNB and the SeNB, as in block 630.

In one example, the computer circuitry can be further configured to determine that the dedicated preamble is successfully transmitted to the SeNB when the UE receives downlink or uplink scheduling with a cell radio network temporary identifier (C-RNTI) during a random access response window. In addition, the computer circuitry can be further configured to send a scheduling request to the SeNB when the UE completes the RRC reconfiguration procedure of the SeNB, the scheduling request indicating to the SeNB that the radio resource information of the secondary cell has been modified.

In one example, the computer circuitry can be further configured to receive the RRC reconfiguration message from the MeNB, the RRC reconfiguration message indicating to remove a secondary cell served by the SeNB; and determine to not send an RRC reconfiguration complete message to the SeNB when the RRC reconfiguration message is for removal of the secondary cell. In addition, the computer circuitry can be further configured to send the RRC reconfiguration complete message to the SeNB or the MeNB upon receiving the RRC reconfiguration message indicating removal of the secondary cell; and remove the secondary cell after sending the RRC reconfiguration complete message in order to limit future communications between the UE and the SeNB.

In one example, the computer circuitry can be further configured to send a scheduling request to the SeNB when the secondary cell associated with the SeNB is deactivated, wherein the scheduling request indicates that uplink data is in a logical channel associated with the SeNB. In addition, the computer circuitry can be further configured to send a buffer status report (BSR) of the secondary cell that is deactivated to the MeNB when uplink data is in a logical channel associated with the SeNB, wherein the MeNB forwards the BSR to the SeNB.

Figure 7:
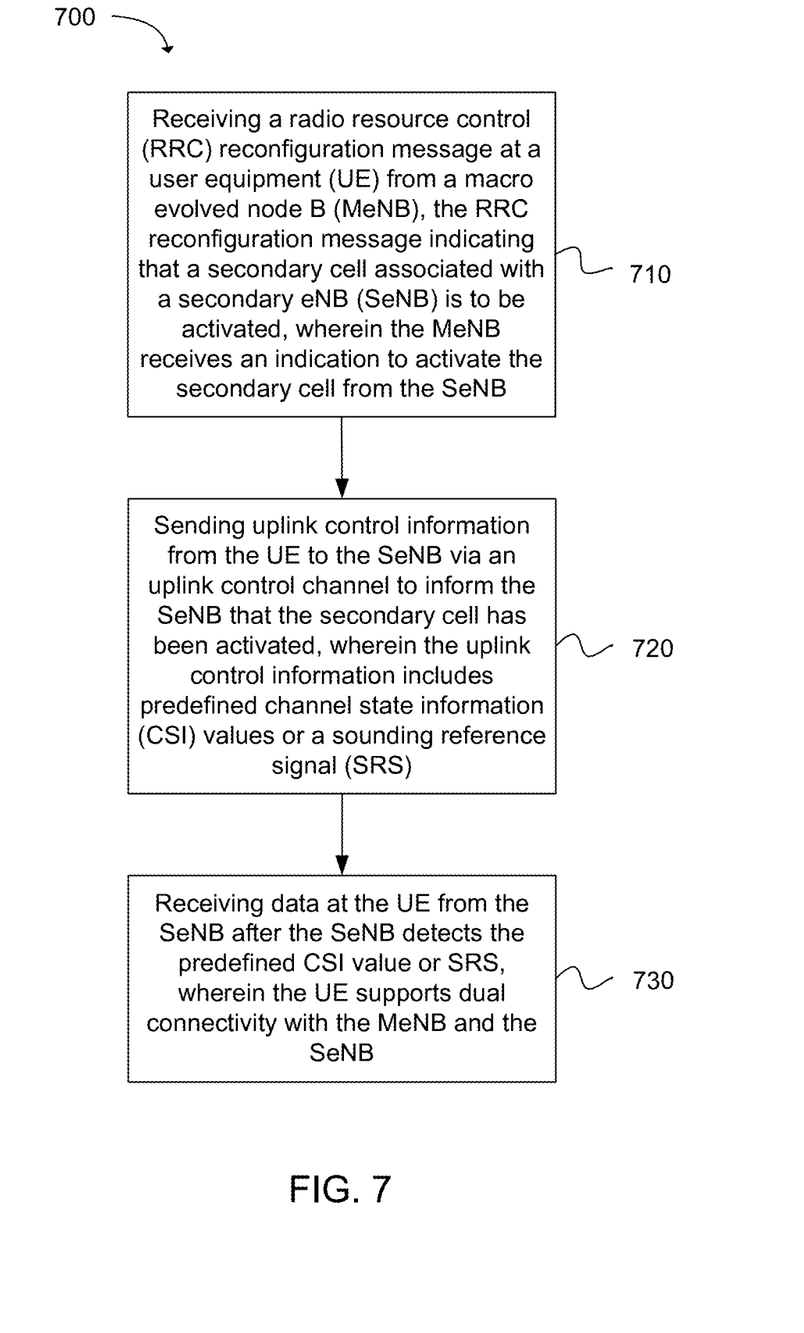
FIG. 7 depicts a flowchart of a method for supporting dual connectivity in accordance with an example.

Another example provides a method 700 for supporting dual connectivity, as shown in the flow chart in FIG. 7. The method may be executed as instructions on a machine, where the instructions are included on at least one computer readable medium or one non-transitory machine readable storage medium. The method includes the operation of receiving a radio resource control (RRC) reconfiguration message at a user equipment (UE) from a macro evolved node B (MeNB), the RRC reconfiguration message indicating that a secondary cell associated with a secondary eNB (SeNB) is to be activated, wherein the MeNB receives an indication to activate the secondary cell from the SeNB, as in block 710. The method includes the operation of sending uplink control information from the UE to the SeNB via an uplink control channel to inform the SeNB that the secondary cell has been activated, wherein the uplink control information includes predefined channel state information (CSI) values or a sounding reference signal (SRS), as in block 710. In addition, the method includes the operation of receiving data at the UE from the SeNB after the SeNB detects the predefined CSI value or SRS, wherein the UE supports dual connectivity with the MeNB and the SeNB, as in block 730.

In one configuration, the method can include receiving a secondary cell activation media access channel control element (MAC CE) in the RRC reconfiguration message from the MeNB, wherein the MeNB informs the SeNB that the MAC CE was successfully received at the UE. In one example, the MAC CE includes an activation time for which the secondary cell is to be activated by the SeNB. In addition, the method can include sending a random access preamble upon receiving the MAC CE from the MeNB, wherein the random access preamble indicates to the SeNB that the secondary cell has been activated. Furthermore, at least one non-transitory machine readable storage medium comprising a plurality of instructions can be adapted to be executed to implement the method 700.

Figure 8:
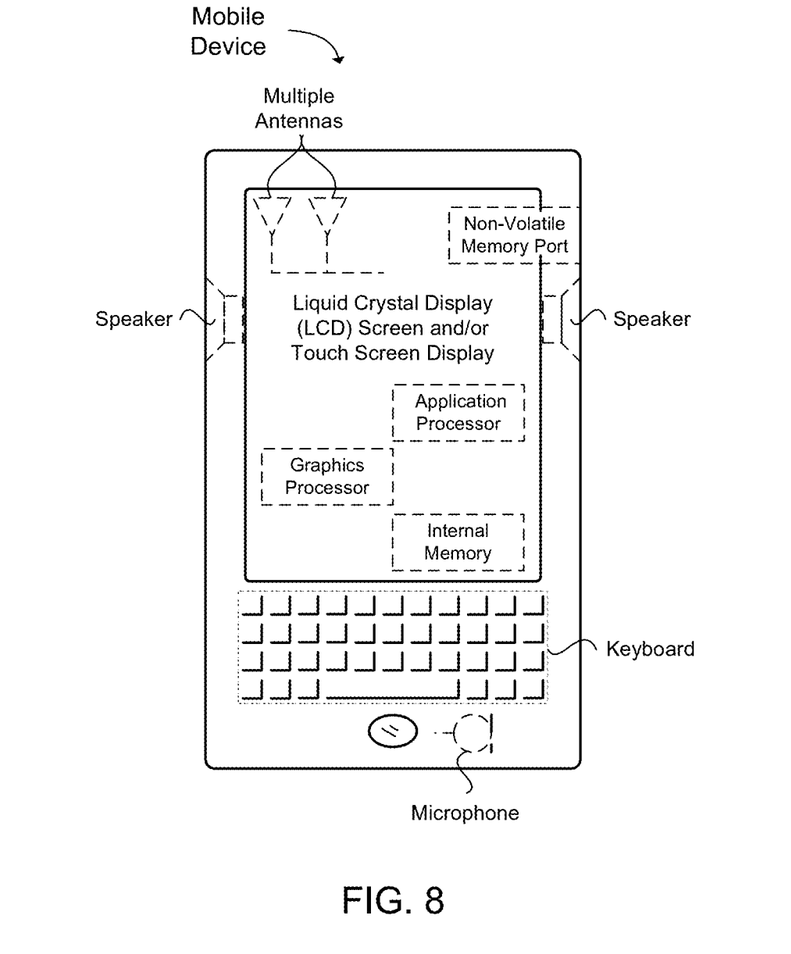
FIG. 8 illustrates a diagram of a wireless device (e.g., UE) in accordance with an example.

FIG. 8 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to support dual connectivity, the UE having computer circuitry configured to:
    receive a first radio resource control (RRC) reconfiguration message from a macro evolved node B (MeNB), the first RRC reconfiguration message indicating that a secondary cell associated with a secondary eNB (SeNB) is to be added for connection to the UE;
    complete a first RRC reconfiguration procedure to add the secondary cell;
    send a first preamble to the SeNB indicating that the UE has completed the first RRC reconfiguration procedure to add the secondary cell, wherein the UE sends the first preamble to the SeNB before the SeNB is activated by the MeNB using a media access control (MAC) control element (CE);
    communicate data with the SeNB after sending the first preamble to the SeNB, wherein the UE supports dual connectivity to the MeNB and the SeNB;
    receive a second RRC reconfiguration message from the MeNB, the second RRC reconfiguration message indicating that radio resource information of the secondary cell associated with the SeNB is to be modified;
    complete a second RRC reconfiguration procedure to modify the secondary cell; and
    send a second preamble to the SeNB indicating that the UE has completed the second RRC reconfiguration procedure to modify the secondary cell, wherein the UE does not receive a random access response (RAR) message from the SeNB in response to the second preamble when the secondary cell is modified.

2. The computer circuitry of claim 1, further configured to send the first preamble and the second preamble to the SeNB using contention based random access.

3. The computer circuitry of claim 1, further configured to send a first RRC complete message and a second RRC complete message to the MeNB substantially in parallel with sending the first preamble and the second preamble to the SeNB, respectively.

4. The computer circuitry of claim 1, further configured to:
    receive the RAR message from the SeNB; and
    send an Msg3 message including a cell radio network temporary identifier (C-RNTI) to the SeNB, wherein the SeNB determines that the UE has added the secondary cell upon receiving the Msg3 message with the C-RNTI.

5. The computer circuitry of claim 1, further configured to send the first preamble and the second preamble to the SeNB using contention free random access.

6. The computer circuitry of claim 1, further configured to send the first preamble and the second preamble to the SeNB in a physical random access channel (PRACH), wherein the first preamble and the second preamble are dedicated preamble resource configurations received, at the UE, from the MeNB in a physical downlink control channel (PDCCH) order message.

7. The computer circuitry of claim 6, wherein the dedicated preamble resource configurations for the SeNB are received at the UE from the MeNB in the first RRC reconfiguration message and the second RRC reconfiguration message, wherein the MeNB can receive dedicated preamble information in a secondary cell radio resource information message from the SeNB via an X2 interface.

8. The computer circuitry of claim 1, further configured to:
receive a dedicated preamble from the MeNB;
send the dedicated preamble to the SeNB using a physical random access channel (PRACH);
receive the RAR message from the SeNB; and
perform an uplink transmission to at least one of the MeNB and the SeNB.

9. The computer circuitry of claim 1, wherein the MeNB is associated with one of an anchor cell, macro cell or primary cell and the SeNB is associated with one of a booster cell, small cell or secondary cell.

10. The computer circuitry of claim 1, wherein the MeNB supports delay-sensitive traffic and the SeNB supports delay-tolerant traffic.

11. A user equipment (UE) operable to support dual connectivity, the UE having computer circuitry configured to:
receive a radio resource control (RRC) reconfiguration message from a macro evolved node B (MeNB), the RRC reconfiguration message indicating to modify radio resource information of a secondary cell associated with a secondary eNB (SeNB);
send a dedicated preamble to the SeNB indicating that the UE has completed an RRC reconfiguration procedure to modify the secondary cell, wherein the UE does not receive a random access response (RAR) from the SeNB after sending the dedicated preamble to the SeNB; and
perform an uplink transmission to the SeNB having modified radio resource information, the UE supporting dual connectivity to the MeNB and the SeNB.

12. The computer circuitry of claim 11, further configured to determine that the dedicated preamble is successfully transmitted to the SeNB when the UE receives downlink or uplink scheduling with a cell radio network temporary identifier (C-RNTI) during a random access response window.

13. The computer circuitry of claim 11, further configured to send a scheduling request to the SeNB when the UE completes the RRC reconfiguration procedure of the SeNB, the scheduling request indicating to the SeNB that the radio resource information of the secondary cell has been modified.

14. The computer circuitry of claim 11, further configured to:
receive the RRC reconfiguration message from the MeNB, the RRC reconfiguration message indicating to remove a secondary cell served by the SeNB; and
determine to not send an RRC reconfiguration complete message to the SeNB when the RRC reconfiguration message is for removal of the secondary cell.

15. The computer circuitry of claim 11, further configured to:
receive the RRC reconfiguration message from the MeNB, the RRC reconfiguration message indicating to remove a secondary cell served by the SeNB;
send an RRC reconfiguration complete message to the SeNB or the MeNB upon receiving the RRC reconfiguration message indicating removal of the secondary cell; and
remove the secondary cell after sending the RRC reconfiguration complete message in order to limit future communications between the UE and the SeNB.

16. The computer circuitry of claim 11, further configured to send a scheduling request to the SeNB when the secondary cell associated with the SeNB is deactivated, wherein the scheduling request indicates that uplink data is in a logical channel associated with the SeNB.

17. The computer circuitry of claim 16, further configured to send a buffer status report (BSR) of the secondary cell that is deactivated to the MeNB when uplink data is in a logical channel associated with the SeNB, wherein the MeNB forwards the BSR to the SeNB.

18. A method for supporting dual connectivity, the method comprising:
receiving a radio resource control (RRC) reconfiguration message at a user equipment (UE) from a macro evolved node B (MeNB), the RRC reconfiguration message indicating that a secondary cell associated with a secondary eNB (SeNB) is to be activated, wherein the MeNB receives an indication to activate the secondary cell from the SeNB;
sending uplink control information from the UE to the SeNB via an uplink control channel to inform the SeNB that the secondary cell has been activated, wherein the uplink control information includes a sounding reference signal (SRS), and the SeNB initiates scheduling for the UE after detection of the SRS; and
receiving data at the UE from the SeNB after the SeNB detects the predefined CSI value or SRS, wherein the UE supports dual connectivity with the MeNB and the SeNB.

19. The method of claim 18, further comprising receiving a secondary cell activation media access channel control element (MAC CE) in the RRC reconfiguration message from the MeNB, wherein the MeNB informs the SeNB that the MAC CE was successfully received at the UE.

20. The method of claim 19, wherein the MAC CE includes an activation time for which the secondary cell is to be activated by the SeNB.

21. The method of claim 19, further comprising sending a random access preamble upon receiving the MAC CE from the MeNB, wherein the random access preamble indicates to the SeNB that the secondary cell has been activated.

22. At least one non-transitory machine readable storage medium comprising a plurality of instructions adapted to be executed to implement the method of claim 18.

* * * * *